United States Patent
Jin et al.

(10) Patent No.: US 10,804,813 B2
(45) Date of Patent: Oct. 13, 2020

(54) POWER INVERTER FOR REDUCING TOTAL HARMONIC DISTORTION VIA DUTY CYCLE CONTROL

(71) Applicant: Ford Global Technologies, LLC, Dearborn, MI (US)

(72) Inventors: Gang Jin, Westland, MI (US); Karl Wojcik, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/191,087

(22) Filed: Nov. 14, 2018

(65) Prior Publication Data
US 2020/0153423 A1    May 14, 2020

(51) Int. Cl.
*H02M 7/48* (2007.01)
*H02M 7/5387* (2007.01)
*H02M 1/00* (2006.01)

(52) U.S. Cl.
CPC ....... *H02M 7/4807* (2013.01); *H02M 7/5387* (2013.01); *H02M 7/53873* (2013.01); *H02M 2001/007* (2013.01); *H02M 2001/0022* (2013.01)

(58) Field of Classification Search
CPC ............... H02M 1/12; H02M 7/53873; H02M 2001/0022; H02M 2001/0019; H02M 2001/0025; H02M 1/14; H02M 1/42; H02M 1/44; H02M 1/4233; H02M 7/42; H02M 7/44; H02M 7/48; H02M 2007/4811; H02M 7/53; H02M 7/538; H02M 7/53803; H02M 7/5387; H02M 7/53871; H02M 7/539; H02M 2001/007; H02M 7/4807; H03K 5/1565; H03K 5/2472
See application file for complete search history.

(56) References Cited

U.S. PATENT DOCUMENTS

| | | | |
|---|---|---|---|
| 5,657,220 A * | 8/1997 | Yan | H02M 7/539 363/132 |
| 6,882,550 B1 * | 4/2005 | Baumgart | H02M 1/12 323/207 |
| 7,391,195 B2 | 6/2008 | Tiew et al. | |
| 7,495,491 B2 | 2/2009 | Wu | |
| 8,384,457 B2 | 2/2013 | Ozgun et al. | |
| 9,225,251 B2 | 12/2015 | Yang et al. | |
| 10,020,724 B2 | 7/2018 | Weida et al. | |
| 2003/0178889 A1 * | 9/2003 | Algrain | H02M 3/33584 307/43 |

(Continued)

*Primary Examiner* — Gustavo A Rosario-Benitez
(74) *Attorney, Agent, or Firm* — Frank Lollo; Eversheds Sutherland (US) LLP (57) ABSTRACT

A power inverter includes primary switches, a transformer, a rectifier, a high voltage (HV) bus, an H-bridge, a detector, and a feedback controller. The transformer receives a switched direct current (DC) signal from a battery. The H-bridge outputs an AC signal to a stepped load. The detector detects a step-up load change by monitoring the stepped load. The feedback controller regulates a duty cycle of the AC signal, thereby reducing total harmonic distortion (THD) affecting the power inverter and the stepped load. The feedback controller further regulates the duty cycle of the AC signal by temporarily setting the primary switching duty cycle at a maximum allowable level in response to the step-up load change.

13 Claims, 7 Drawing Sheets

(56) References Cited

U.S. PATENT DOCUMENTS

| | | | |
|---|---|---|---|
| 2008/0205087 A1 | 8/2008 | Asuncion et al. | |
| 2008/0315793 A1* | 12/2008 | Sanchez | H02M 7/53873 315/297 |
| 2009/0237968 A1* | 9/2009 | Dooley | H02M 7/4807 363/97 |
| 2012/0087159 A1* | 4/2012 | Chapman | H02J 3/381 363/41 |
| 2013/0051092 A1* | 2/2013 | Cooper | H02J 3/383 363/37 |
| 2014/0265641 A1* | 9/2014 | Inoue | H02M 7/48 307/151 |
| 2015/0180430 A1* | 6/2015 | Wang | H03F 3/217 381/120 |
| 2015/0263609 A1* | 9/2015 | Weida | H02M 3/156 323/234 |
| 2015/0288335 A1* | 10/2015 | Hoyerby | H03F 3/217 330/251 |
| 2017/0244325 A1* | 8/2017 | Carralero | H02M 3/33507 |
| 2018/0013348 A1* | 1/2018 | Paul | H02M 3/1584 |
| 2019/0056757 A1* | 2/2019 | Bollman | H02M 3/156 |

\* cited by examiner

FIG. 6

POWER INVERTER FOR REDUCING TOTAL HARMONIC DISTORTION VIA DUTY CYCLE CONTROL

TECHNICAL FIELD

The present disclosure generally relates to a power system and, more specifically, a power system including a power inverter for reducing total harmonic distortion via duty cycle control.

BACKGROUND

Known power inverters convert direct current (DC) drawn from a battery to alternating current (AC) for driving utility loads. Generally, an AC output voltage generated by these power inverters include high total harmonic distortion (THD) due to high bus voltage and low duty cycle. High THD increases stress in the overall architecture of such power inverters including, in many cases, the output loads. Therefore, it may be desirable to lower THD of the AC output voltage.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example power inverter and power system are disclosed. A power inverter includes primary switches, a transformer, a rectifier, a high voltage (HV) bus, an H-bridge, a detector, and a feedback controller. The transformer receives a switched DC input. The H-bridge outputs an AC signal having a duty cycle. The detector detects a step-up load change. The feedback controller regulates the switching duty cycle of the primary switches to achieve a low AC output THD during continuous variations of battery voltage and output load and temporarily set a switching duty cycle of the primary switches at a maximum allowable level in response to the step-up load change.

An example power system includes a battery, a load, and a power inverter. The power inverter includes primary switches. The power inverter regulates an alternating current (AC) voltage to the load by adjusting the a switching duty cycle of the primary switches. The power inverter also monitors the load, and temporarily sets the switching duty cycle to a maximum allowable level in response to detecting a step-up load change.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Figure 1:
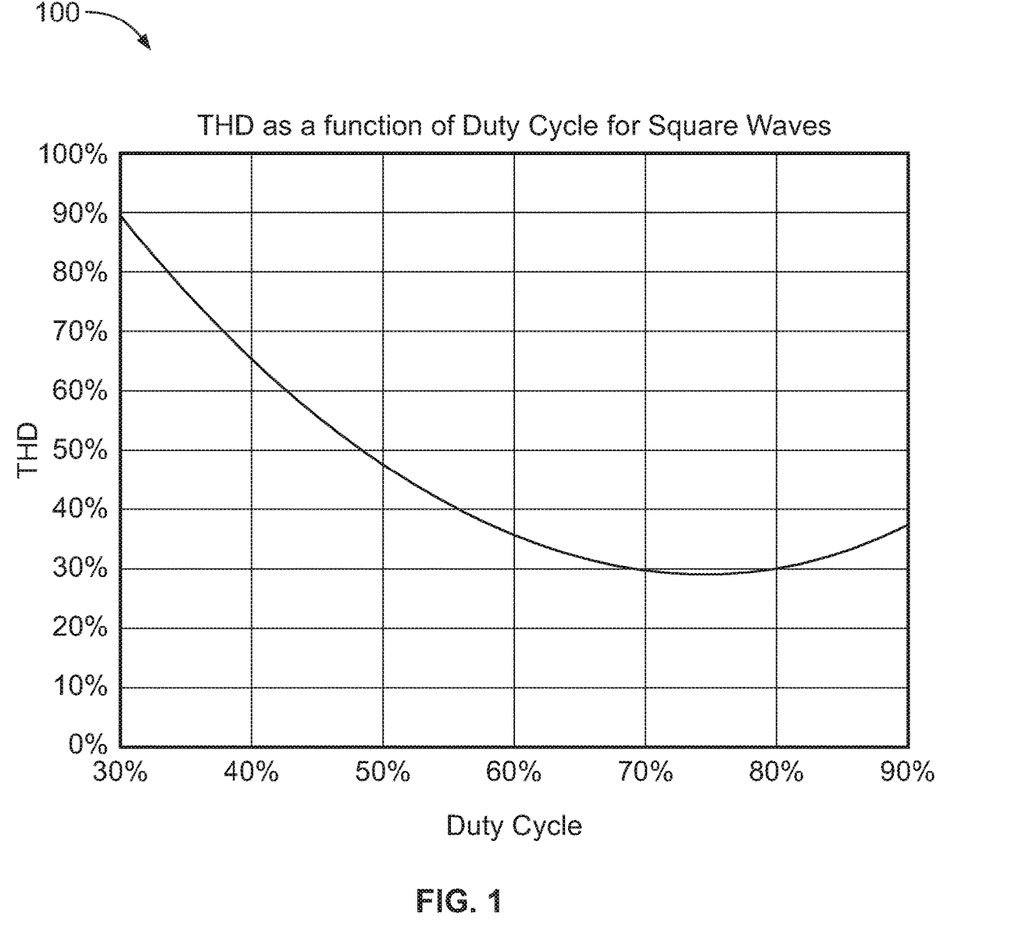
FIG. 1 illustrates an example graph representing the THD of an AC output voltage as a function of the duty cycle of the AC output voltage.

Power inverters convert DC drawn from a battery to AC for driving utility loads. An example power inverter circuit architecture may include a battery, primary switches, a transformer, a rectifier, a low pass filter, a full bridge, and a load. In such example, the battery is electrically connected through the primary switches to the primary windings of the transformer, the rectifier are electrically connected to the secondary windings of the transformer, outputs of the rectifier are electrically connected to the low pass filter, outputs of the low pass filter are electrically connected to the full bridge, and outputs of the full bridge are electrically connected to the load. The rectifier with the low pass filter provide high voltage (HV) bus, which is switched on/off by the full bridge to generate an AC output signal having a modified sine wave (MSW), and the AC output signal is provided to the load. The duty cycle of the MSW is regulated by the full bridge to a set root mean square (RMS) value. In power inverter architectures, an increase in the THD of the MSW increases stress in the overall architecture of a power inverter. For idealized square wave pulse width modulated (PWM) signals, there is a direct relationship between the duty cycle of the MSW and the HV bus and between the duty cycle of the MSW and the THD of the MSW. The duty cycle of the MSW is modeled by the equation below:

Duty cycle of MSW=(RMS voltage of AC output signal÷HV bus voltage)²     Equation 1:

FIG. 1 illustrates an example graph 100 representing the THD of the MSW as a function of the duty cycle of the MSW. In the illustrated example, the minimum THD level is reached when the duty cycle of the MSW is set within the 70-80% range. While it may be desirable to set the duty cycle of the MSW within said range, the duty cycle of the MSW may drift out of the said range due to disturbances on the battery and the load causing the HV bus voltage to fluctuate. Further, a step-up load change may cause the HV bus of the power inverters to drop out. Thus, there is a need for a power inverter that minimizes the THD of the MSW under influences of disturbances on the battery and the load and is also functional in response to a step-up load change.

As described below, a power inverter includes primary switches, a transformer, a rectifier, an AC output switch, a sensing node, a stepped load detector, and an AC duty cycle feedback controller. The AC output switch simulates an H-bridge in application and generates an AC output signal based on the HV bus voltage. The stepped load detector is electrically connected with the sensing node and generates a step-up load change signal in response to detecting a stepped-up load change. AC duty cycle feedback controller generates a primary switch control signal to alter the primary switching duty cycle based on the H-bridge AC output duty cycle signal and the step-up load change signal. Specifically, the AC duty cycle feedback controller includes a first controller and a second controller. During normal operations, the first controller generates: (1) a measured voltage based on the H-bridge AC output duty cycle signal; (2) a reference voltage; and (3) an analog voltage signal by comparing the measured voltage with the reference voltage, and the second controller generates the primary switch control signal based on the analog voltage signal. When a step-up load change is detected, the second controller temporarily boosts the switching duty cycle to a maximum allowable level by adjusting the primary switch control signal and then returns the control to the first controller by generating the primary switch control signal based on the analog voltage signal.

The power inverter may be particularly useful in applications where there is a large variation of input battery voltage and output load current. For example, the power inverter may be used as an automotive on-board inverter that supports a vehicle start-stop feature.

Figure 2:
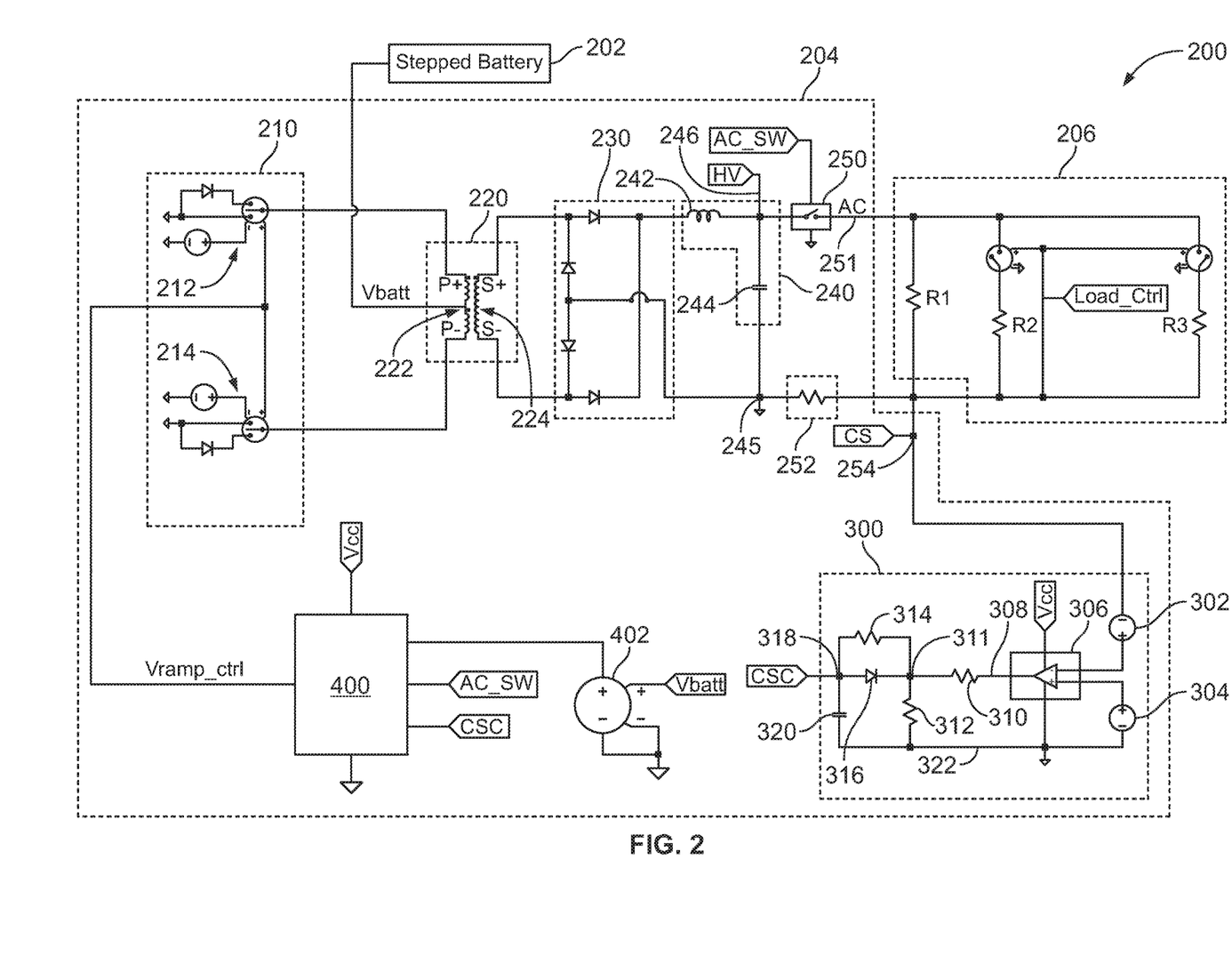
FIG. 2 illustrates a power system in accordance with the teachings described herein.

FIG. 2 illustrates a power system in accordance with the teachings described herein. The power system 200 includes a stepped battery 202, a power inverter 204, and a stepped load 206.

The stepped battery 202 provides a plurality of DC outputs. The plurality of DC outputs may be defined by a plurality of voltages. For example, the plurality of voltage may include 10 volts, 13 volts, and 16 volts. It should be appreciated that the values of the plurality of voltage and the number of DC outputs may be different based on design choice and parameters. In some examples, the stepped battery may be controlled to select and output one of the plurality of voltages as a switched battery voltage Vbatt based on a signal received from an external controller (not illustrated).

The stepped load 206 defines a plurality of loads that operate based on AC power. The plurality of loads may operate based a plurality of AC power values. For example, the plurality of AC power values may be 40 W, 440 W, and 840 W. It should be appreciated that the plurality of power values and the number of loads may be different based on design choice and parameters. For illustrative purposes, resistors R1, R2, and R3 define the plurality of loads. In the illustrated example, an external controller may provide a load control signal Load_Ctrl to the stepped load to select one of the plurality of AC power values. For example, when the voltage level of the load control signal Load_Ctrl is at a first level, only the minimum load of 40 W is applied to the AC output. When the voltage level of the load control signal Load_Ctrl is at a second greater level, the applied total load is at 40 W plus 400 W. When the load is at a third greater level, the applied total load is at 40 W plus 800 W.

The power inverter 204 is electrically connected to the stepped battery 202 and the stepped load 206. The power inverter 204 converts the switched battery voltage Vbatt as an AC output signal AC to the stepped load 206. The power inverter 204 includes a push pull driver 210, a transformer 220, a rectifier 230, a low pass filter 240, a ground node 245, a HV bus 246, an AC output switch 250, a resistor 252, a sensing node 254, a stepped load detector 300, and an AC duty cycle feedback controller 400.

The push pull driver 210 includes a first primary switch 212 and a second primary switch 214. Each of the first primary switch 212 and the second primary switch 214 may be a metal-oxide-semiconductor field-effect transistor (MOSFET). A primary switch control signal Vramp_ctrl is applied to the first primary switch 212 and the second primary switch 214 as a control for setting the switching duty cycle of the first primary switch 212 and the second primary switch 214. The push pull driver 210 effects the duty cycle of the AC output signal AC based on the voltage level of the primary switch control signal Vramp_ctrl.

The transformer 220 includes a primary side 222 and a secondary side 224. The primary side 222 is electrically connected to the push pull driver 210 and the stepped battery 202, and the secondary side 224 is electrically connected to the rectifier 230. The transformer 220 alters the voltage level of the switched battery voltage Vbatt and provides an altered AC voltage to the rectifier 230. The turn ratio of a primary coil of the primary side 222 to a secondary coil of the secondary side 224 may be 1:16.

The rectifier 230 is a full-bridge rectifier. Input ends of the rectifier 230 are electrically connected to the secondary side of the transformer 220 and output ends of the rectifier 230 are electrically connected to the low pass filter 240.

The low pass filter 240 includes an inductor 242 and a capacitor 244. The inductance of the inductor may be 300 μH and the capacitance of the capacitor may be 330 μF. The low pass filter 240 modifies voltage output from the output ends of the rectifier 230 by passing signals with a frequency lower than a threshold frequency and attenuates signals with frequencies higher than the threshold frequency.

The ground node 245 is shared by the rectifier 230, the low pass filter 240, and the resistor 252.

The HV bus 246 is a node connecting the low pass filter 240 and the AC output switch 250. A high voltage signal HV is generated at the HV bus 246.

In the illustrated example, the AC output switch 250 is a reduced H-bridge. The reduced H-bridge models an H-bridge by reducing the total number of switches included in the H-bridge. It should be appreciated that the power inverter 204 may include an H-bridge having a full set of switches in lieu of the reduced H-bridge. The AC output switch 250 modifies the high voltage signal HV by converting the same to a rectangular pulse output (i.e. MSW) with a predetermined RMS value. The AC output switch outputs the MSW as the AC output signal AC to the stepped load 206 through an AC output node 251. The AC output switch 250 may include a microcontroller (not illustrated) for generating an H-bridge AC output duty cycle signal AC_SW. In some examples, the microcontroller may be an external controller. The AC output switch 250 generates the AC output signal AC based on the H-bridge AC output duty cycle signal AC_SW. The H-bridge AC output duty cycle signal AC_SW corresponds to the duty cycle of the AC output signal AC.

The sensing node 254 is shared by the resistor 252, the stepped load 206, and the stepped load detector 300. A sensing voltage CS is generated at the sensing node 254.

The stepped load detector 300 includes a first voltage source 302, a second voltage source 304, a comparator 306, a first node 308, a first resistor 310, a second node 311, a second resistor 312, a third resistor 314, a diode 316, a third node 318, a capacitor 320, and a ground node 322. The first voltage source 302 is electrically connected to the sensing node 254 and a negative input terminal of the comparator 306. The second voltage source 304 is electrically connected to a positive input of the comparator 306 and the ground node 322. The voltage level of the first voltage source 302 and the second voltage source 304 may be 4.5 V. The comparator 306 includes an output terminal, the positive input terminal, the negative input terminal. The output terminal is electrically connected to the first node 308. The comparator 306 is electrically connected to the ground node 322 and is supplied by a supply voltage Vcc. The voltage level of the supply voltage Vcc may be 5 V. The comparator 306 may be implemented as an analog device or a digital device. The first node 308 is further connected to the first resistor 310. The resistance of the first resistor 310 may be 1K Ohms. The first resistor 310 is further connected to a second node 311. The second node 311 is shared by the first resistor 310, the second resistor 312, the third resistor 314, and the diode 316. The resistance of the second resistor 312 may be 1M Ohms. The resistance of the third resistor 314 may be 100K Ohms. The diode 316 is positioned such that the diode 316 allows current flow from the third node 318 to the second node 311. The third node 318 is shared by the third resistor 314, the diode 316, and the capacitor 320. The third node 318 provides a step-up load change signal CSC. The capacitance of the capacitor 320 may be 0.5 µF. The ground node 322 is shared by the capacitor 320, the second resistor 312, the comparator 306, and the second voltage source 304. The stepped load detector 300 monitors the sensing node 254 to detect a step-up change of the stepped load 206. Specifically, the stepped load detector 300 generates the step-up load change signal CSC in response to detecting a step-up load change. The stepped load detector sharply drops the voltage level of the step-up load change signal CSC in response to detecting the step-up load change, and renders insignificant or no change to the voltage level of the step-up load change signal CSC in response to detecting a step-down load change.

The AC duty cycle feedback controller 400 generates the primary switch control signal Vramp_ctrl based on the step-up load change signal CSC, the battery voltage Vbatt, H-bridge AC output duty cycle signal AC_SW. In some examples, the battery voltage Vbatt may be provided to the AC duty cycle feedback controller via a voltage controlled voltage source 402. In such examples, the control for the voltage controlled voltage source 402 may be the battery voltage Vbatt. The AC duty cycle feedback controller 400 is supplied by the supply voltage Vcc and is electrically connected to a ground node. Details of the AC duty cycle feedback controller 400 will be described in detail below.

Figure 3A:
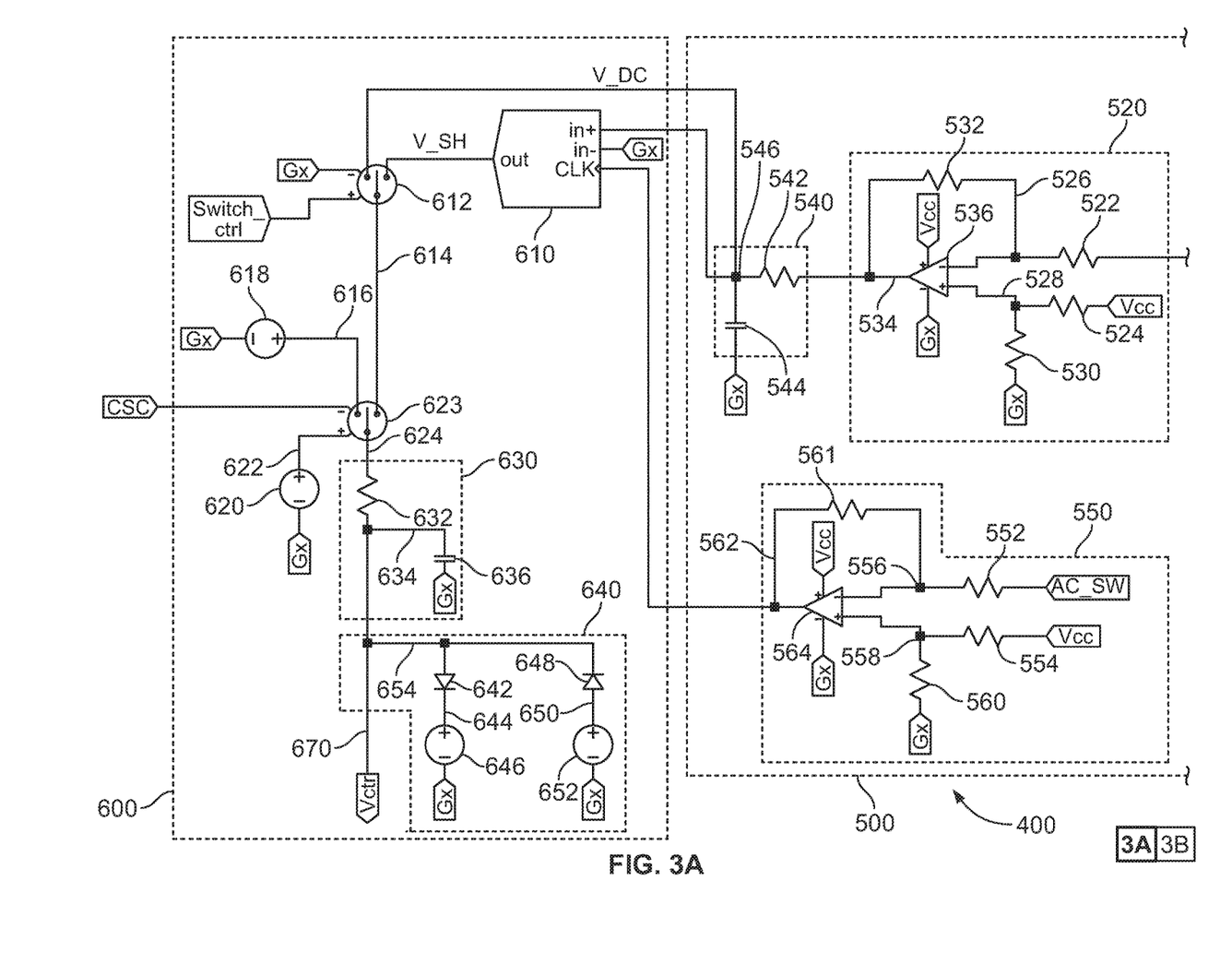
FIGS. 3A and 3B illustrate a detailed view of an AC duty cycle feedback controller of the power system of FIG. 2.
Figure 3B:
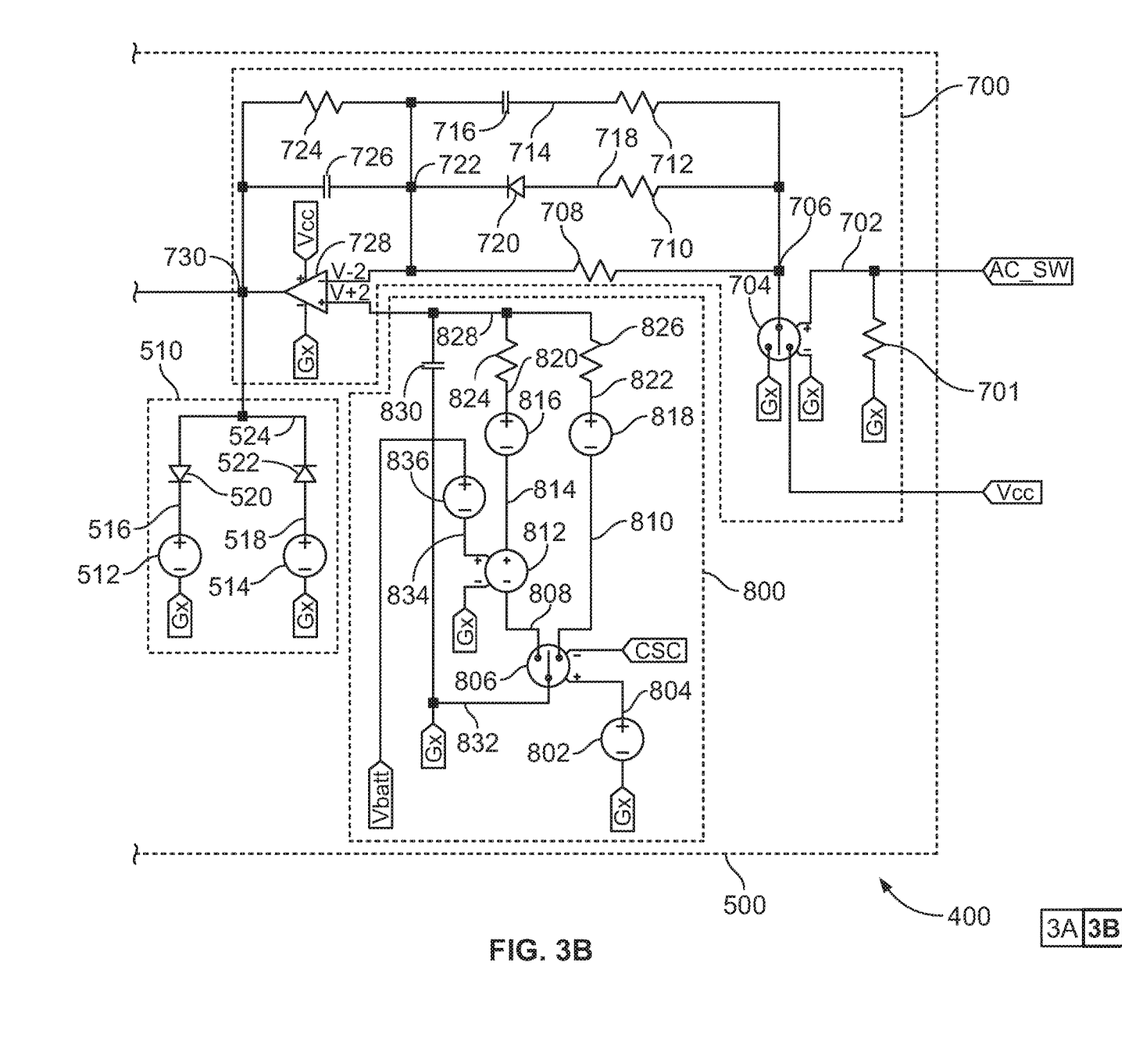

FIGS. 3A and 3B illustrate the detailed view of the AC duty cycle feedback controller 400 of the power system 200 of FIG. 2. Each of FIGS. 3A and 3B forms a partial view of the detailed view. FIG. 3A illustrates the left half of the detailed view and FIG. 3B illustrates the right half of the detailed view.

The AC duty cycle feedback controller 400 includes a first controller 500 and a second controller 600.

The first controller 500 includes a feedback compensator 700, a feed forward compensator 800, a duty cycle limiter 510, a gain inverter 520, a low pass filter 540, and a duty cycle control digitizer trigger generator 550. The first controller 500 adjusts the primary switch control signal Vramp_ctrl based on the H-bridge AC output duty cycle signal AC_SW, the step-up load change signal CSC, and the battery voltage Vbatt.

The feedback compensator 700 includes a first resistor 701, a first node 702, a switch 704, a second node 706, a second resistor 708, a third resistor 710, a fourth resistor 712, a third node 714, a first capacitor 716, a fourth node 718, a diode 720, a fifth node 722, a fifth resistor 724, a second capacitor 726, a comparator 728, and a sixth node 730. The first resistor 701 is electrically connected to the ground. The resistance of the first resistor 701 may be 100K Ohms. The first node 702 is shared by the first resistor 701 and the switch 704. The first node 702 receives the H-bridge AC output duty cycle signal AC_SW. The switch 704 is electrically connected to the ground and the supply voltage. The switch 704 operates such that if the voltage different between the H-bridge AC output duty cycle signal AC_SW and the ground is greater than a threshold voltage, the second node 706 is connected to the supply voltage Vcc. Otherwise, the second node 706 is connected to the ground. The threshold voltage may be defined as Vcc/2. The second node 706 is shared by the switch 704, the second resistor 708, the third resistor 710, and the fourth resistor 712. The resistances of the second resistor 708, the third resistor 710, and the fourth resistor 712 may be 5K Ohms, 10K Ohms, and 20K Ohms, respectively. The third node 714 is shared by the first capacitor 716 and the fourth resistor 712. The fourth node 718 is shared by the third resistor 710 and the diode 720. The fifth node 722 is shared by the first capacitor 716, the diode 720, the second resistor 708, the fifth resistor 724, the second capacitor 726, and a negative input terminal of the comparator 728. The diode 720 allows current to flow from the fourth node 718 to the fifth node 722. The capacitance of the first capacitor 716 may be 1 µF. The resistance of the fifth resistor 724 may be 4.7K Ohms. The capacitance of the second capacitor 726 may be 10 µF. The comparator 728 is supplied by the supply voltage Vcc and the ground. The comparator 728 functions as a PID controller. The sixth node 730 is shared by an output terminal of the comparator 728, the second capacitor 726, and the fifth resistor 724. The feedback compensator 700 provides a measured voltage V−2 at the fifth node 722. The measured voltage V−2 is generated based on the H-bridge AC output duty cycle signal AC_SW. The second capacitor 726 provides a main integration factor with the fifth resistor 724 to limit DC gain so as to minimize overshoot in a step response. The diode 720 ensures that the HV bus 246 drives up faster in response to a step-up load change versus slower in response to a step-down load change.

The feed forward compensator 800 includes a first voltage source 802, a first node 804, a switch 806, a second node 808, a third node 810, a voltage controlled voltage source 812, a fourth node 814, a second voltage source 816, a third voltage source 818, a sixth node 820, a seventh node 822, a first resistor 824, a second resistor 826, an eight node 828, a capacitor 830, a ninth node 832, a tenth node 834, and a fourth voltage source 836. The first voltage source 802 is electrically connected to the ground. The first voltage source 802 may provide a threshold reference voltage, which may be 4.5 V. The first node 804 is shared by the switch 806 and the first voltage source 802. The switch 806 is responsive to the voltage levels of the step-up load change signal CSC and the first node 804. The switch 806 operates such that if the voltage difference between the threshold reference voltage and the step-up load change signal CSC is greater than a threshold voltage, the switch 806 electrically connects the ninth node 832 and the third node 810. Otherwise, the switch electrically connects the ninth node 832 and the second node 808. The threshold voltage may be 0.5 V. The second node 808 is shared by the switch 806 and the voltage controlled voltage source 812. The third node 810 is shared by the third voltage source 818 and the switch 806. The voltage level of the third voltage source 818 may be 1.5 V. The fourth node 814 is shared by the voltage controlled voltage source 812 and the second voltage source 816. The fifth node 814 is shared by the voltage controlled voltage source 812 and the third voltage source 816. The voltage level of the third voltage source 816 maybe 3 V. The voltage controlled voltage source 812 function as a fine tune of a reference voltage V+2 (i.e., at the eighth node 828) based on the switched battery voltage Vbatt. The sixth node 820 is shared by the third voltage source 816 and the first resistor 824. The seventh node 822 is shared by the third voltage source 818 and the second resistor 826. The eight node 828 is shared by the capacitor 830, the first resistor 824, and the second resistor 826. The eight node 828 is further shared by the positive input terminal of the feedback compensator 700. The ninth node 832 is shared by the capacitor 830 and the switch 806. The capacitance of the capacitor 830 may be 1 μF. The tenth node 834 is shared by the voltage controlled voltage source 812 and the fourth voltage source 836. The voltage level of the fourth voltage source 836 may be 160 V. The fourth voltage source 836 is further connected to a pin receiving the switched battery voltage Vbatt. The feed forward compensator 800 provides the reference voltage V+2 at the eight node 828 based the step-up load change signal. The feed forward compensator 800 provides a first electrical path including the ninth node 832, the third node 810, the third voltage source 818, the seventh node 822, the second resistor 826, and the eighth node 828 in response to a voltage difference change between the threshold reference voltage of the first voltage source 802 and the step-up load change signal CSC being greater than the threshold voltage (e.g., when a step-up load change is detected). This ensures that the duty cycle of the reference voltage V+2 is maintained at or around 30%. Such duty cycle may be defined by a ratio of the voltage level of the third voltage source 818 and the supply voltage Vcc. The feed forward compensator further provides a second electrical path including the ninth node 832, the second node 808, the voltage controlled voltage source 812, the fifth node 814, the third voltage source 816, the sixth node 820, the first resistor 824, and the eight node 828 in response to a voltage difference between the threshold reference voltage of the first voltage source 802 and the step-up load change signal CSC being less than the threshold voltage (e.g., when there is no step-up load change). This ensures that the duty cycle of the reference voltage V+2 is maintained at or around 60%. Such duty cycle may be defined by a ratio of the voltage level of the third voltage source 816 and the supply voltage. The feed forward compensator 800 operates as follows. During the normal operation (i.e., when a step-up load change is not detected), the reference voltage V+2 is set based on the second electrical path. Further, the capacitor 830 is charged via the second electrical path. When the step-up load change is detected, the reference voltage V+2 is set based on the first electrical path. Further, the capacitor 830 is discharged via the first electrical path.

The duty cycle limiter 510 includes a first voltage source 512, a second voltage source 514, a first node 516, a second node 518, a first diode 520, a second diode 522, and a third node 524. The first voltage source 512 and the second voltage source 514 are electrically connected to the ground. The voltage levels of the first voltage source 512 and the second voltage source 514 may be 4.5 V and 0.5 V, respectively. The first node 516 is shared by the first diode 520 and the first voltage source 512. The second node 518 is shared by the second diode 522 and the second voltage source 514. The third node 524 is shared by the first diode 520 and the second diode 522. The first diode 520 allows current to flow from the third node 524 to the first node 516. The second diode 522 allows current to flow from the second node 518 to the third node 524. The third node 524 of the duty cycle limiter 510 and the sixth node 730 of the feedback compensator 700 are the same node. The duty cycle limiter 510 limits the duty cycle of a signal output by the comparator 728 of the feedback compensator 700 by limiting the maximum value of the duty cycle to 90% and limiting the minimum value of the duty cycle to 10%.

The gain inverter 520 includes a first resistor 522, a second resistor 524, a first node 526, a second node 528, a third resistor 530, a fourth resistor 532, a third node 534, and a comparator 536. The first resistor 522 is electrically coupled to the third node 524 of the duty cycle limiter 510 and the sixth node 730 of the feedback compensator 700. The first node 526 is shared by the first resistor 522, the fourth resistor 532, and a negative input terminal of the comparator 536. The second resistor 524 is electrically connected to a pin receiving the supply voltage Vcc. The second node 528 is shared by a positive input terminal of the comparator 536, the second resistor 524, and the third resistor 530. The third resistor 530 is electrically connected to the ground. The third node 534 is connected to the output terminal of the comparator 536 and the fourth resistor 532. The resistance of the first resistor 522, the second resistor 524, the third resistor 530, and the fourth resistor 532 may be 10K Ohms. The comparator 536 is supplied by the supply voltage Vcc and the ground. The gain inverter 520 inverts the signal output by the comparator 728 of the feedback compensator 700.

The low pass filter includes a resistor 542, a capacitor 544, and a node 546. The node 546 is shared by the resistor 542 and the capacitor 544. The capacitor 544 is electrically connected to the ground. The resistor 542 of the low pass filter 540 is electrically connected to the third node 534 of the gain inverter 520. The resistance of the resistor 540 may be 1K Ohms, and the capacitance of the capacitor 544 may be 1 μF. The low pass filter 540 filters the output signal of the comparator 536 of the gain inverter 520 by smoothing the curves of said output signal. The signal provided at the node 546 is defined as an analog voltage signal V_DC.

The duty cycle control digitizer trigger generator 550 includes a first resistor 552, a second resistor 554, a first node 556, a second node 558, a third resistor 560, a fourth resistor 561, a third node 562, and a comparator 564. The first resistor 552 is electrically connected to a pin receiving the H-bridge AC output duty cycle signal AC_SW. The first node 556 is shared by the first resistor 552, the fourth resistor 561, and a negative input terminal of the comparator 564. The second resistor 554 is electrically connected to a pin receiving the supply voltage Vcc. The second node 558 is shared by a positive input terminal of the comparator 564, the second resistor 554, and the third resistor 560. The third resistor 560 is electrically connected to the ground. The third node 562 is electrically connected to an output terminal of the comparator 564 and the fourth resistor 561. The resistance of the first resistor 552, the second resistor 554, the third resistor 560, and the fourth resistor 561 may be 10K Ohms. The duty cycle control digitizer trigger generator 550 generates a clock signal CLK at the third node 562 based on the H-bridge AC output duty cycle signal AC_SW and the supply voltage Vcc.

The second controller 600 includes a duty cycle digitizer 610, a first switch 612, a first node 614, a second node 616, a first voltage source 618, a second voltage source 620, a third node 622, a second switch 623, a fourth node 624, a low pass filter 630, a duty cycle limiter 640, and a fifth node 670.

The duty cycle digitizer 610 includes a positive input terminal, a negative input terminal, a clock input terminal and an output terminal. The positive input terminal is electrically connected to the node 546 of the low pass filter 540 of the first controller 500 and receives the analog voltage signal V_DC. The negative terminal is electrically connected to the ground. The clock input terminal is electrically connected to the third node 562 of the duty cycle control digitizer trigger generator 550. The duty cycle digitizer 610 converts the analog voltage signal V_DC to a digital voltage signal V_SH by using the clock signal CLK as a sampling trigger.

The first switch 612 is electrically connected to the output terminal of the DC digitizer 610 and the node 546 of the low pass filter 540 of the first controller 500. The first switch 612 is further electrically connected to the ground and a pin receiving a first switch control signal Switch_ctrl. The first switch control Switch_ctrl signal may be provided by an external controller. The first switch 612 is further electrically connected to the second switch 623. The first switch 612 operates such that if the voltage difference between the first switch control signal Switch_ctrl and the ground is greater than a threshold voltage, the first switch selects the analog voltage signal V_DC and outputs the same to the second switch 623. Otherwise, the first switch 612 outputs the digital voltage signal V_SH. The threshold voltage may be defined as Vcc/2.

The first node 614 is shared by the first switch 612 and the second switch 623. The second node 616 is shared by the first voltage source 618 and the second switch 623. The third node 622 is shared by the second voltage source 620 and the second switch 623. The fourth node 624 is shared by the low pass filter 630 and the second switch 623. The voltage level of the first voltage source 618 may be 4.5 V. The first voltage source 620 may provide a threshold reference voltage, which may be 4.5 V. The second voltage 618 and the second voltage source 620 are further electrically connected to the ground.

The second switch 623 is further electrically connected to a pin receiving the step-up load change signal CSC. The second switch 623 operates such that if the voltage difference between the threshold reference voltage of the first voltage source 620 and the step-up load change signal CSC is greater than a threshold voltage, the second switch 623 electrically connects the fourth node 624 and the second node 616. If said voltage difference is less than the threshold voltage, the second switch 623 electrically connects the fourth node 624 and the first node 614. The threshold voltage may be 0.5 V.

The low pass filter 630 includes a resistor 632, a node 634, and a capacitor 636. The resistor 632 is electrically connected to the fourth node 624 of the second controller 600. The node 634 is shared by the resistor 632 and the capacitor 636. The capacitor 636 is electrically connected to the ground. The resistance of the resistor 632 may be 1K Ohms, and the capacitance of the capacitor 636 may be 2 µF. The low pass filter 630 smoothens the signal generated at the node 634.

The saturation limiter 640 includes a first diode 642, a first node 644, a first voltage source 646, a second diode 648, a second node 650, a second voltage source 652, and a third node 654. The first node 644 is shared by the first diode 642 and the first voltage source 646. The second node 650 is shared by the second diode 648 and the second voltage source. 652 The third node 654 is shared by the first diode 642 and the second diode. The first diode 642 is arranged such that a current flows from the third node 654 to the first node 644. The second diode 648 is arranged such that a current flows second node 650 to the third node 654. The voltage levels of the first voltage source 646 and the second voltage source 652 may be 4.5 V and 0.5 V, respectively. The saturation limiter 640 limits the duty cycle of the signal generated at the third node 654 by limiting the maximum value of the duty cycle to 90% and limiting the minimum value of the duty cycle to 10%.

The fifth node 670 is defined by the node 634 of the low pass filter 630 and the third node 654 of the saturation limiter 640. At this node, the primary switch control signal Vramp_ctrl is generated and is provided to the push pull drivers 210.

In some examples, the AC duty cycle feedback controller 400 may exclude the first switch 612 of the second controller 600, the duty cycle digitizer 610, and the duty cycle control digitizer trigger generator 550. In such examples, the analog voltage signal V_DC is directly provided to the second switch 623 of the second controller 600.

Figure 4:
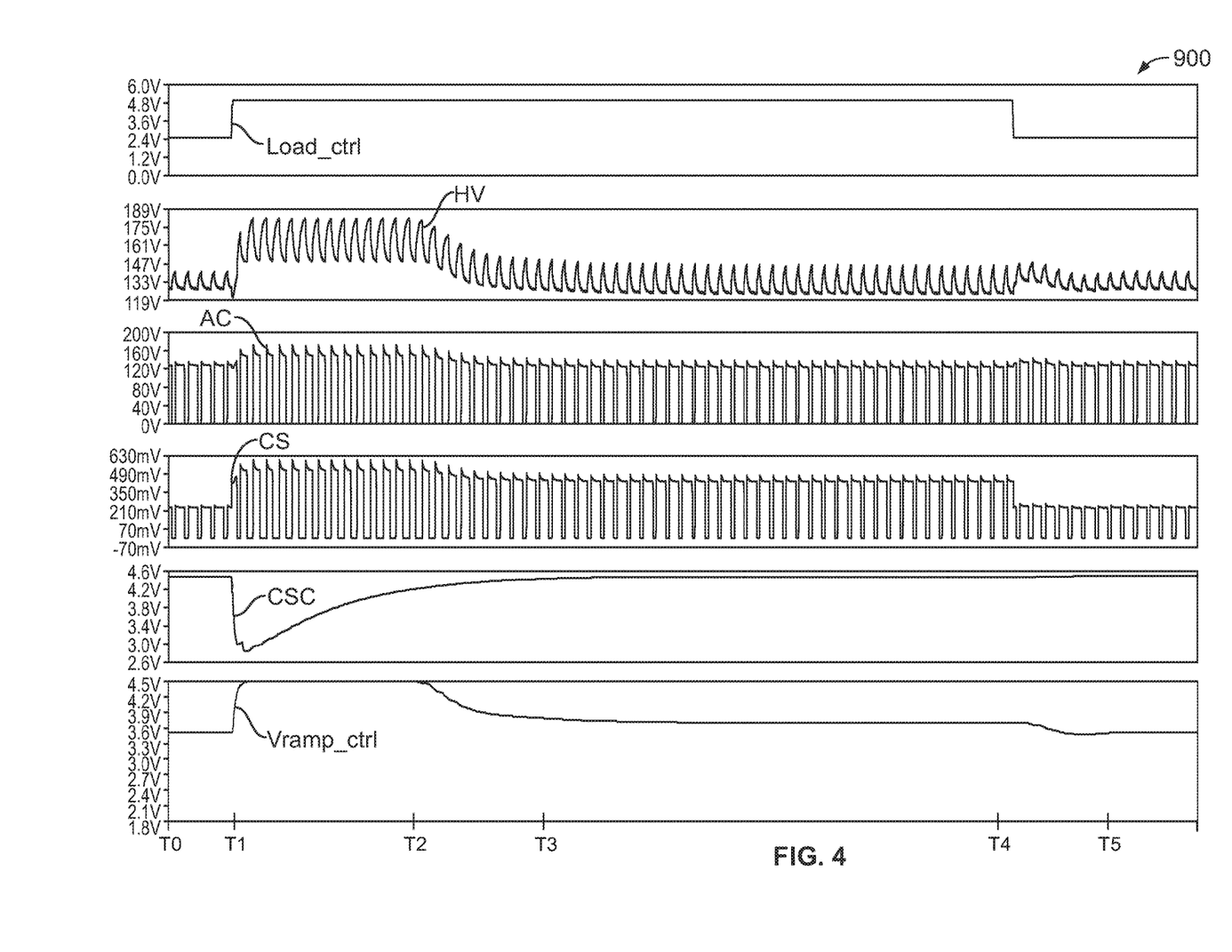
FIG. 4 illustrates a plurality of graphs demonstrating voltage levels of nodes within the power system of FIG. 2 with respect to time.

FIG. 4 illustrates a plurality of graphs 900 demonstrating voltage levels of nodes within the power system 200 of FIG. 2 with respect to time.

From $T_0$ to T1, it is assumed that the load control signal Load_ctrl is at the second level and the load is at about 440 W. During this period: (1) the average voltage level of the HV bus is maintained around 133 V; (2) the duty cycle of the AC output signal AC is maintained around 75%; (3) the sensing voltage CS of the sensing node 254 is proportional to that of the AC output signal AC, and the duty cycle of the sensing voltage CS of the sensing node 254 corresponds to that of the AC output signal; (4) the step-up load change signal CSC is steady; and (5) the primary switch control signal Vramp_ctrl is steady.

At T1, it is assumed that an external controller causes the voltage level of the load control signal Load_Ctrl to increase from the second level to the third greater level. In response: (1) the load increases to about 840 W; (2) the voltage level of the HV bus temporarily drops (e.g. to 121 V) due to the sudden increase in the load; (3) and the sensing voltage CS of the sensing node 254 increases. To prevent the voltage level of the HV bus 246 to further drop, the stepped load detector drops the voltage level of the step-up load change signal CSC in response the voltage increase at the sensing node 254. In response, the AC duty cycle feedback controller 400 sets the voltage level of the primary switch control signal Vramp_ctrl to a maximum allowable level. The maximum allowable level causes the first primary switch 212 and the second primary switch 214 to switch at a maximum switching duty cycle. The maximum allowable level may be 4.5 V. As the first primary switch 212 and the second primary switch 214 operate at the maximum switching duty cycle: (1) the voltage level of the HV bus 246 increases; (2) the duty cycle of the AC output signal AC decreases; and (3) the amplitude of the AC output signal AC increases.

From T1 to T2, the primary switch control signal Vramp_ctrl is maintained at 4.5 V. During this period, the duty cycle of the AC output signal AC is maintained around 40%; (2) the average voltage level of the HV bus 246 is maintained around 163 V; and (3) the step-up load change signal CSC gradually increases.

From T2 to T3, as the voltage level of the step-up load change signal CSC continues to increase, the AC duty cycle feedback controller 400 causes the voltage level of the primary switch control signal Vramp_Ctrl to gradually decrease. During this period, the duty cycle of the AC output signal AC gradually increases, and the voltage level of the HV bus 246 gradually decreases.

From T3 to T4, the voltage level of the step-up load change signal CSC gradually plateaus to a steady state, and the AC duty cycle feedback controller 400 causes the voltage level of the primary switch control signal Vramp_Ctrl to also gradually plateau to a steady state. In response, the average voltage level of the HV bus is maintained around 131 V and the duty cycle of the AC output signal is maintained around 75%.

At T4, it is assumed that an external controller causes the voltage level of the load control signal Load_Ctrl to decrease from the third level to the second level. In response: (1) the load decreases to 440 W; (2) the average voltage level of the HV bus 246 increases temporarily to 138 V; (3) and the sensing voltage CS of the sensing node 254 decreases.

From T4 to T5, the voltage level of the step-up load change signal CSC slightly increases, and the primary switch control signal Vramp_Ctrl slightly decreases.

At T5, both the step-up load change signal CSC and the primary switch control signal Vramp_Ctrl maintain a steady voltage level.

Figure 5:
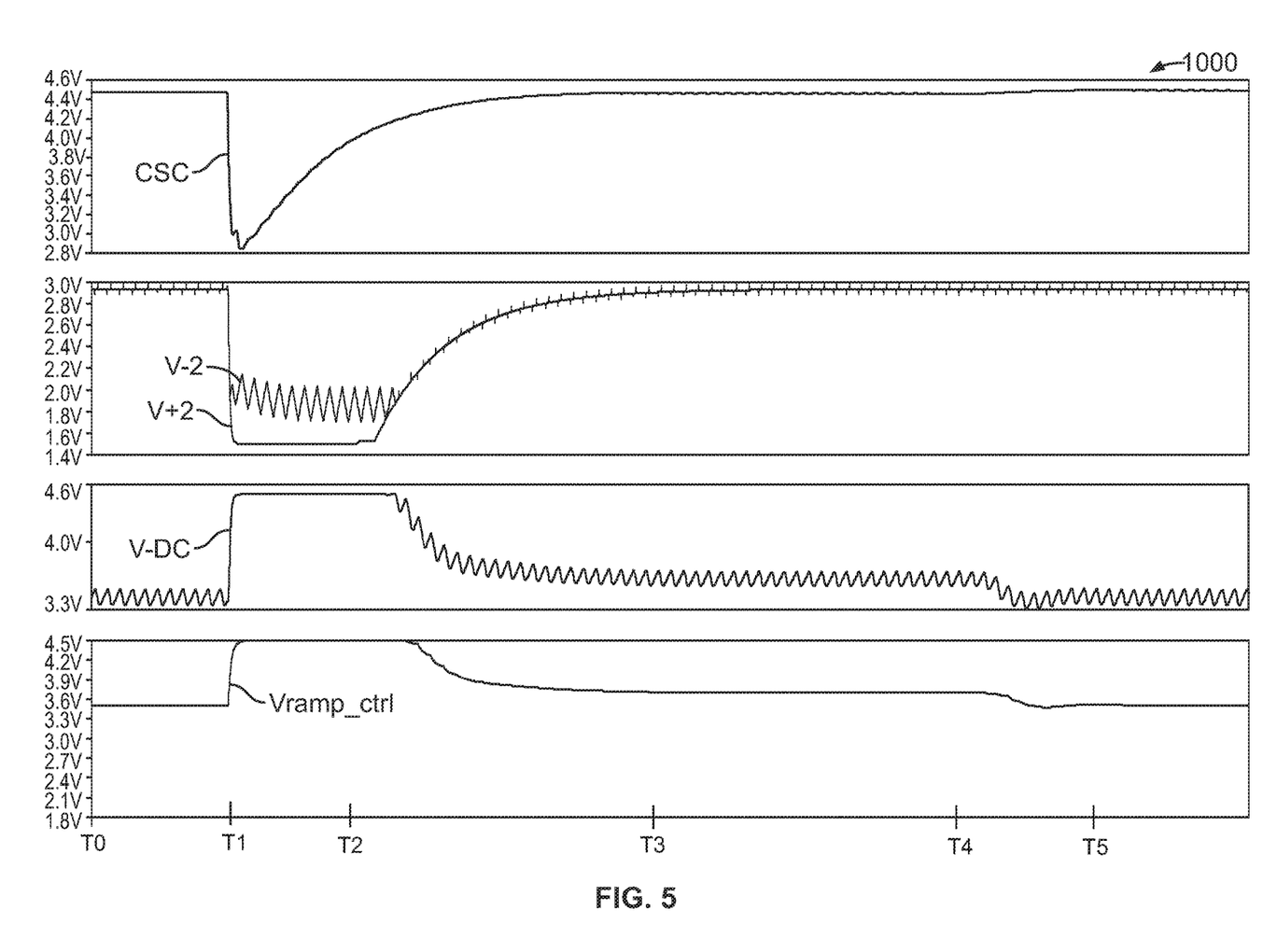
FIG. 5 illustrates a plurality of graphs demonstrating voltage levels of nodes within the AC duty cycle feedback controller of FIGS. 3A and 3B with respect to time.

FIG. 5 illustrates a plurality of graphs 1000 demonstrating voltage levels of nodes within the AC duty cycle feedback controller of FIGS. 3A and 3B with respect to time. In FIG. 5, it is assumed that the first switch 612 of the second controller 600 electrically connects the DC digitizer 610 and the first node 614 of the second controller 600. In alternative examples, the node 546 of the low pass filter 540 of the first controller 500 is directly connected to the second switch 623 of the second controller 600.

From $T_0$ to T1, the step-up load change signal CSC maintains a steady state. During this period: (1) the feed forward compensator 800 provides the second electrical path to the comparator 728 of the feedback compensator 700; (2) the capacitor 830 of the feed forward compensator 800 is fully charged via the second electrical path; (3) the reference voltage V+2 is maintained around 3 V; and (4) the measured voltage V−2 is maintained around 3 V.

At T1, a step-up load change occurs. In response, the step-up load change signal CSC quickly drops. As the step-up load change signal CSC decreases and reaches a voltage value corresponding to the threshold voltage of the second switch 623 of the second controller 600, the voltage level of the primary switch control signal Vramp_Ctrl is set to the voltage level of the first voltage source 618 of the second controller 600. At this time, the feed forward compensator 800 provides the first electrical path to the comparator 728 of the feedback compensator 700, and the capacitor 830 of the feed forward compensator 800 begins to discharge via the first electrical path. In response, the measured voltage V+2 drops to 1.5 V. Further, at this time, the duty cycle of AC output signal AC and the H-bridge AC output duty cycle signal AC_SW decreases. Based on the duty cycle change in the H-bridge AC output duty cycle signal AC_SW and the feedback provided from the sixth node 730, feedback compensator 700 drops the voltage level of the measured voltage V+2.

From T1 to T2: (1) the voltage level of the step-up load change signal CSC gradually increases; (2) the capacitor 830 of the feed forward compensator 800 continues to discharge via the first electrical path; (3) the average level of the measured voltage is maintained around 1.9 V; and (4) the reference voltage is maintained at 1.5 V.

As the step-up load change signal CSC continues to increase, the step-up load change signal CSC reaches, at T2, a voltage value corresponding to the threshold voltage of the second switch 623 of the second controller 600. At this time, the voltage level of the primary switch control signal Vramp_Ctrl is set to the voltage level of the first node 614 of the second controller 600. At this time, the feed forward compensator 800 provides the second electrical path to the comparator 728 of the feedback compensator 700, and the capacitor 830 of the feed forward compensator 800 begins to charge via the second electrical path.

From T2 to T3, the reference voltage V+2 gradually increases as the capacitor 830 of the feed forward compensator 800 continues to charge via the second electrical path. The reference voltage V+2 gradually increases such that the primary switch control signal Vramp_Ctrl is controlled to gradually decrease. The gradual decrease of the primary switch control signal Vramp_Ctrl ensures that the voltage level of the HV bus 246 does not sharply drop.

From T3 to T4, the average voltage level of step-up load change signal CSC, the measured voltage V−2, the average level of reference voltage V+2, and the primary switch control signal Vramp_Ctrl plateaus.

At T4, it is assumed that an external controller causes the voltage level of the load control signal Load_ctrl to decrease from the third level to the second level.

From T4 to T5: (1) the voltage level of the step-up load change signal CSC slightly increases: (2) the average voltage level of the analog voltage signal V_DC slightly decreases; and (3) the primary switch control signal Vramp_Ctrl slightly decreases.

At T5, the step-up load change signal CSC and the primary switch control signal Vramp_Ctrl maintain a steady voltage level. Further, at T5, the analog voltage signal V_DC maintain a steady average voltage level.

Figure 6:
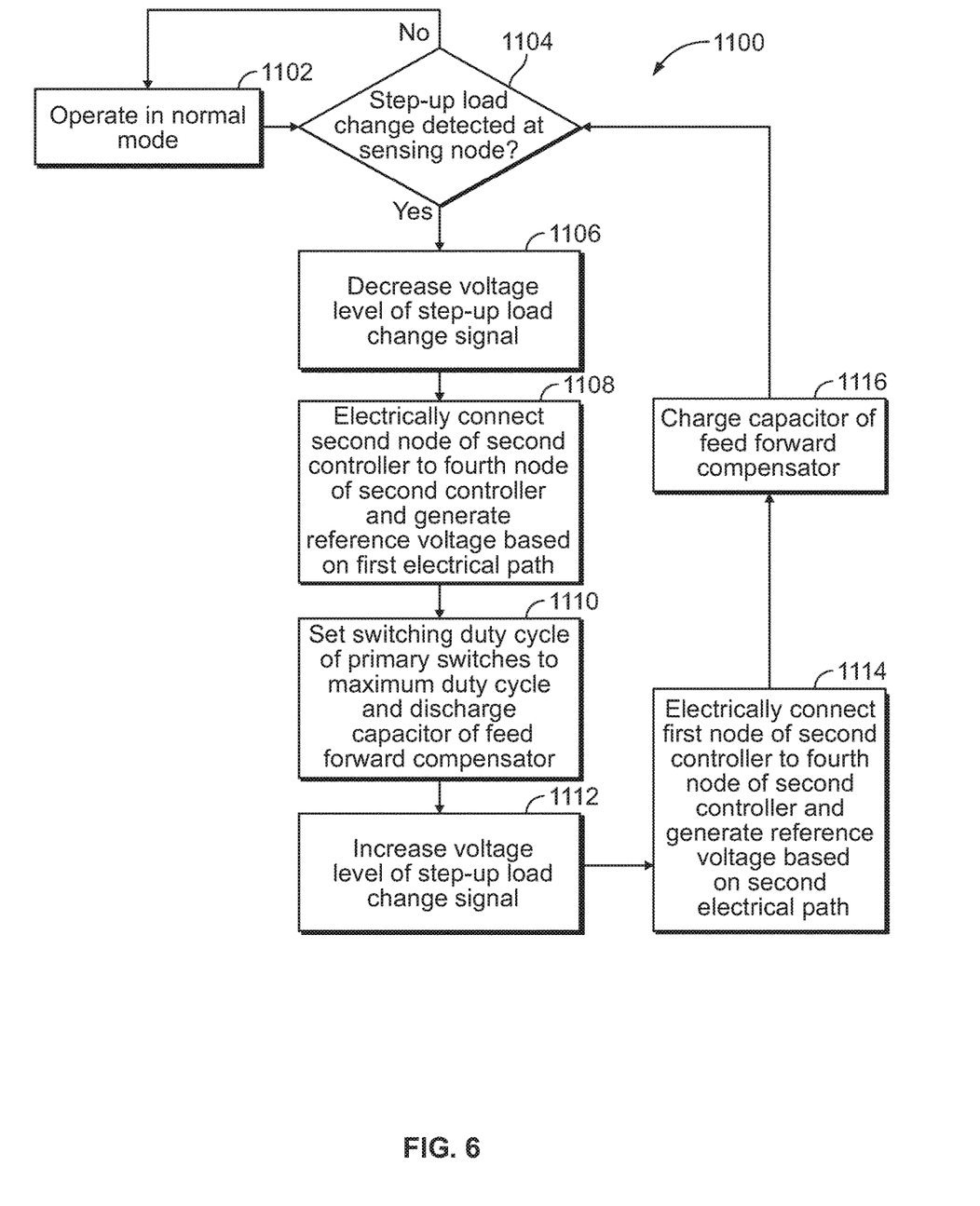
FIG. 6 illustrates a flowchart of a method for operating a power inverter of the power system of FIGS. 2, 3A and 3B.

FIG. 6 illustrates a flowchart of a method 1100 for operating the power inverter 204 of FIGS. 3 and 4.

At block 1102, the power inverter 204 operates at a normal mode. During the normal mode: (1) the voltage level of the primary switch control signal Vramp_ctrl and that of the step-up load change signal CSC are at a steady state; (2) the second switch 623 of the second controller 600 electrically connects the first node 614 of the second controller 600 and the fourth node 624 of the second control 600; (3) the feed forward compensator 800 generates the reference voltage V+2 based on the second electrical path; (4) the capacitor 830 of the feed forward compensator 800 is fully charged; and (5) the AC duty cycle feedback controller 400 regulates the AC output duty cycle signal AC by controlling the duty cycle of the first primary switch 212 and the second primary switch 214 under the influences of disturbances on the stepped battery 202 and the stepped load 206.

At block 1104, the power inverter 204 determines whether a step-up load change has occurred by monitoring the sensing node. If the step-up load change has occurred, the method continues to block 1104. Otherwise, the method returns to block 1102.

At block 1106, the power inverter 204 decreases the voltage of the step-up load change signal CSC.

At block 1108, the power inverter 204 electrically connects the second node 616 of the second controller 600 to the fourth node 624 of the second controller 600 and electrically disconnects the first node 614 of the second controller 600 from the fourth node 624 of the second controller 600. Further, the power inverter 204 causes the feed forward compensator 800 to generate the reference voltage V+2 based on the first electrical path.

At block 1110, the power inverter 204 sets the switching duty cycle of the first primary switch 212 and the second primary switch 214 to the maximum duty cycle. Further, the power inverter 204 discharges the capacitor 830 of the feed forward compensator via the first electrical path.

At block 1112, the power inverter 204 increases the voltage level of the step-up load change signal CSC.

At block 1114, the power inverter 204 electrically connects the first node 614 of the second controller 600 to the fourth node 624 of the second controller 600, and electrically disconnects the second node 616 of the second controller 600 from the fourth node 624 of the second controller 600. Further, the power inverter 204 causes the feed forward compensator 800 to generate the reference voltage V+2 based on the second electrical path.

At block 1116, the power inverter 204 charges the capacitor 830 of the feed forward compensator 800 via the first electrical path.

Although the example method of operating the power inverter 204 is/are described with reference to the flowchart illustrated in FIG. 6, many other methods of implementing the example power inverter 204 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A power inverter comprising:
   primary switches;
   a transformer configured to receive a switched direct current (DC) signal;
   a rectifier;
   an AC output switch configured to output an alternating current (AC) signal having a duty cycle;
   a detector configured to detect a step-up load change;
   a high voltage (HV) bus coupling the rectifier and the AC output switch, wherein the AC output switch is configured to modify the duty cycle of the AC signal based on a voltage level of the HV bus and a predetermined root mean squared (RMS) voltage of the AC signal; and
   a feedback controller configured to:
   regulate the duty cycle; and
   modify a switching duty cycle of the primary switches based on the duty cycle of the AC output switch, wherein the duty cycle of the AC output switch is a discrete signal with an update rate corresponding to a fundamental frequency of the AC signal.

2. The power inverter of claim 1, wherein the feedback controller is further configured to responsive to detecting a step-up load change, temporarily set the switching duty cycle to a maximum allowable level, wherein the step-up load change comprises an output load current increase of at least 50% of a rated output current, and wherein the feedback controller temporarily sets the switching duty cycle of the primary switches at the maximum allowable level only in response to the detector detecting the step-up load change.

3. The power inverter of claim 1, wherein the feedback controller comprises:
   a first controller configured to:
   generate a measured voltage based on an AC output duty cycle signal;
   generate a reference voltage via a first electrical path; and
   generate an analog voltage signal by comparing the measured voltage and the reference voltage; and
   a second controller configured to generate a primary switch control signal for setting the switching duty cycle based on the analog voltage signal.

4. The power inverter of claim 3, wherein the second controller is further configured to, responsive to the step-up load change, generate the primary switch control signal based on a fixed voltage level.

5. The power inverter of claim 4, wherein the second controller is further configured to, responsive to a predetermined period elapsing after the step-up load change, generate the primary switch control signal based on the analog voltage signal.

6. The power inverter of claim 3, wherein the first controller is further configured to, responsive to the step-up load change, generate the reference voltage via a second different electrical path.

7. The power inverter of claim 6, wherein the first controller is further configured to, responsive to a predetermined period elapsing after the step-up load change, generate the reference voltage via the first electrical path.

8. The power inverter of claim 1, wherein the feedback controller is further configured to:
   generate a primary switch control signal for setting the switching duty cycle;
   increase the primary switch control signal from a first level to a second level in response to the step-up load change; and
   responsive to a predetermined period elapsing after the step-up load change, gradually decrease the primary switch control signal from the second level to the first level.

9. The power inverter of claim 3, the second controller comprising a digitizer configured to convert the analog voltage signal to a digital voltage signal based on a clock signal.

10. The power inverter of claim 9, the first controller comprising a duty cycle control digitizer configured to generate the clock signal based on the AC output duty cycle signal.

11. A power system comprising:
    a battery;
    a stepped load; and
    a power inverter comprising:

primary switches; an AC output switch configured to output an alternating current (AC) signal having a duty cycle; a rectifier; and a high voltage (HV) bus coupling the rectifier and the AC output switch, wherein the power inverter is configured to:

modify the duty cycle of the AC signal based on a voltage level of the HV bus and a predetermined root mean squared (RMS) voltage of the AC signal;

provide an alternating current (AC) voltage to the stepped load based on a switching duty cycle of the primary switches;

monitor the stepped load; and modify the switching duty cycle of the primary switches based on the duty cycle of the AC output switch, wherein the duty cycle of the AC output switch is a discrete signal with an update rate corresponding to a fundamental frequency of the AC signal.

12. The power system of claim 11, wherein the power inverter is further configured to responsive to detecting a step-up load change, temporarily set the switching duty cycle to a maximum allowable level, wherein the step-up load change comprises an output load current increase of at least 50% of a rated output current, and wherein power inverter temporarily sets the switching duty cycle to the maximum allowable level only in response to detecting the step-up load change.

13. The power system of claim 11, wherein the power inverter comprises:

a first controller configured to:

generate a measured voltage based on an AC output duty cycle signal;

generate a reference voltage via a first electrical path; and generate an analog voltage signal by comparing the measured voltage and the reference voltage; and a second controller configured to generate a primary switch control signal for setting the switching duty cycle based on the analog voltage signal.

\* \* \* \* \*